Figure 16:
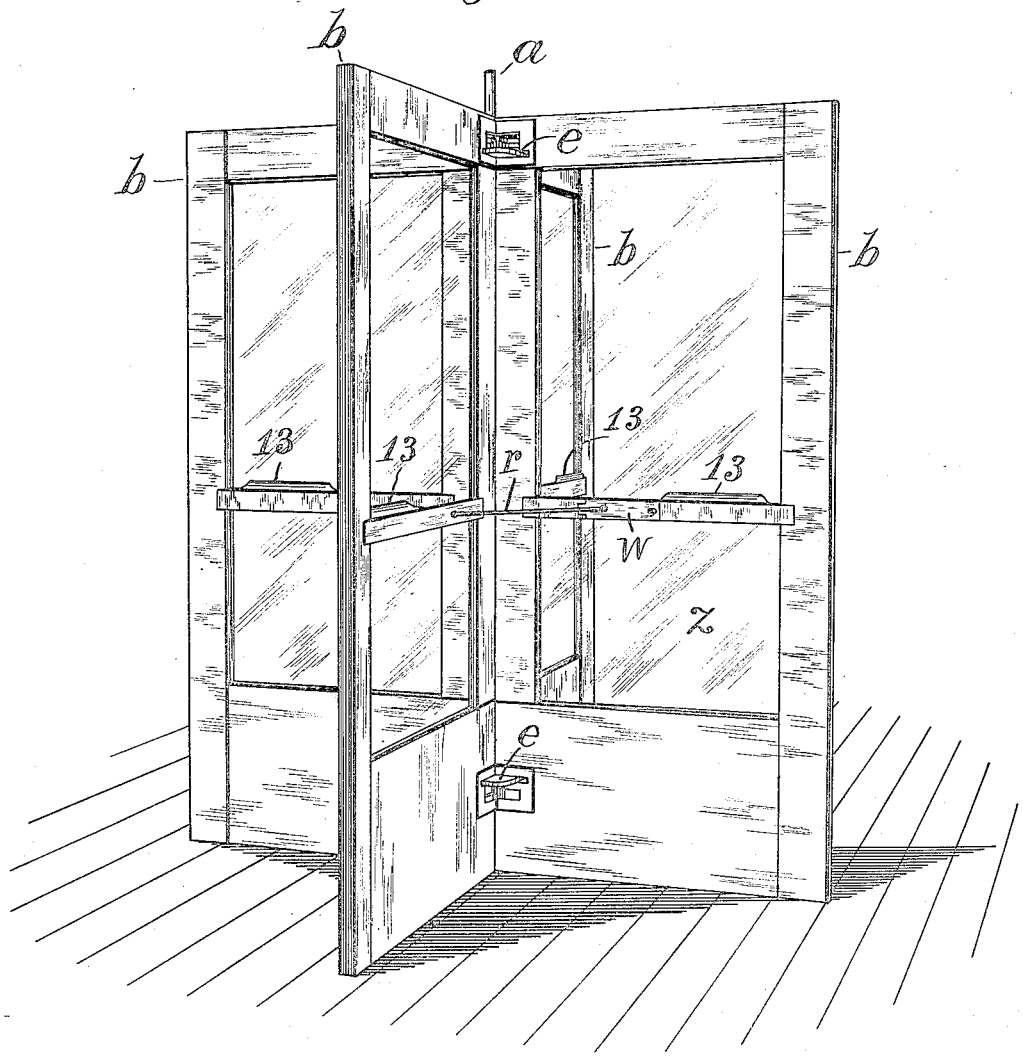

No. 836,843. PATENTED NOV. 27, 1906.
T. VAN KANNEL.
COLLAPSIBLE REVOLVING DOOR.
APPLICATION FILED OCT. 30, 1905.
5 SHEETS—SHEET 1.
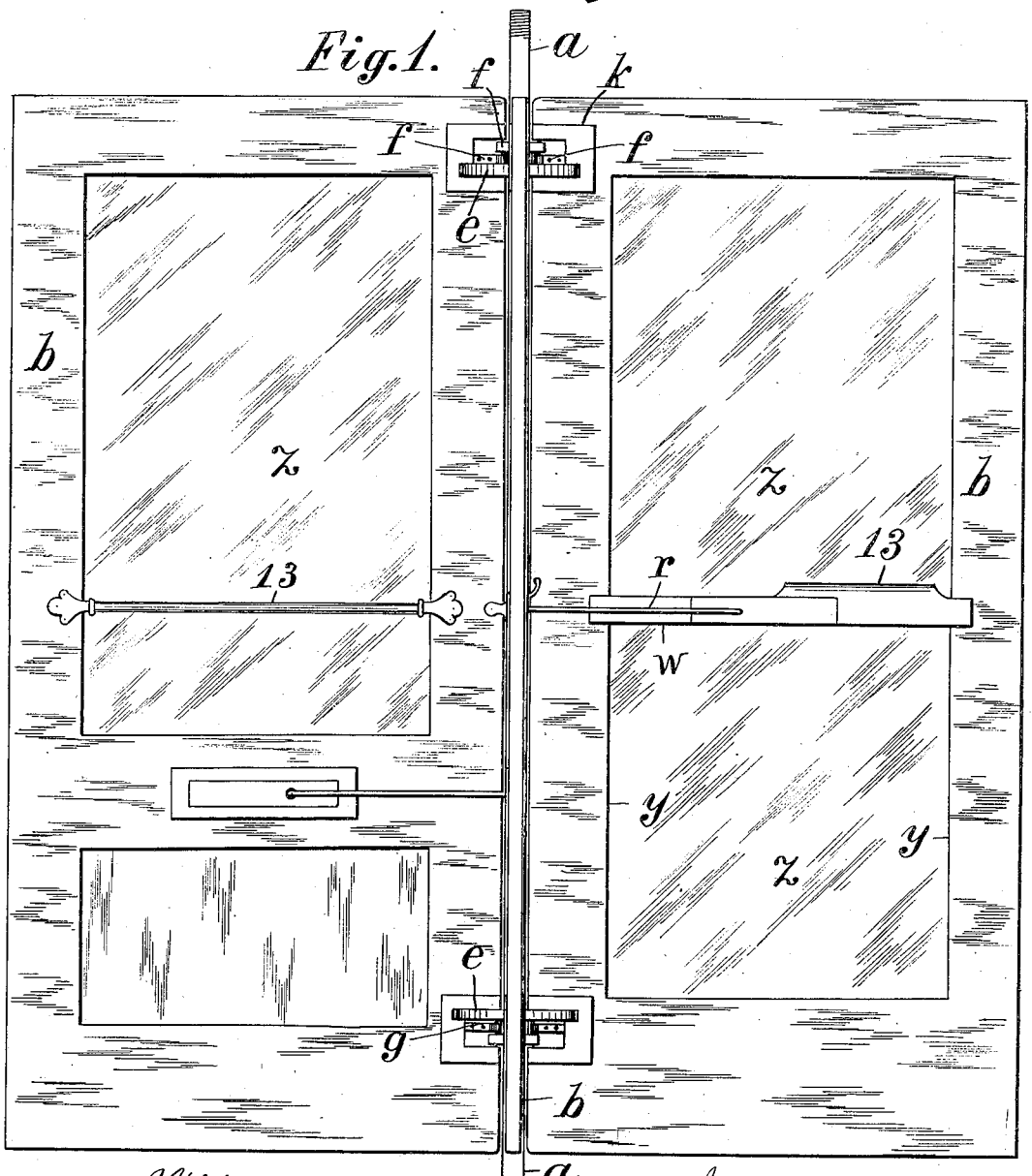
Witnesses:
L. Lee.
Arthur T. Heaton.
Inventor.
Theophilus Van Kannel,
per Thomas S. Crane, Atty No. 836,843. PATENTED NOV. 27, 1906.
T. VAN KANNEL.
COLLAPSIBLE REVOLVING DOOR.
APPLICATION FILED OCT. 30, 1905.
5 SHEETS—SHEET 2.
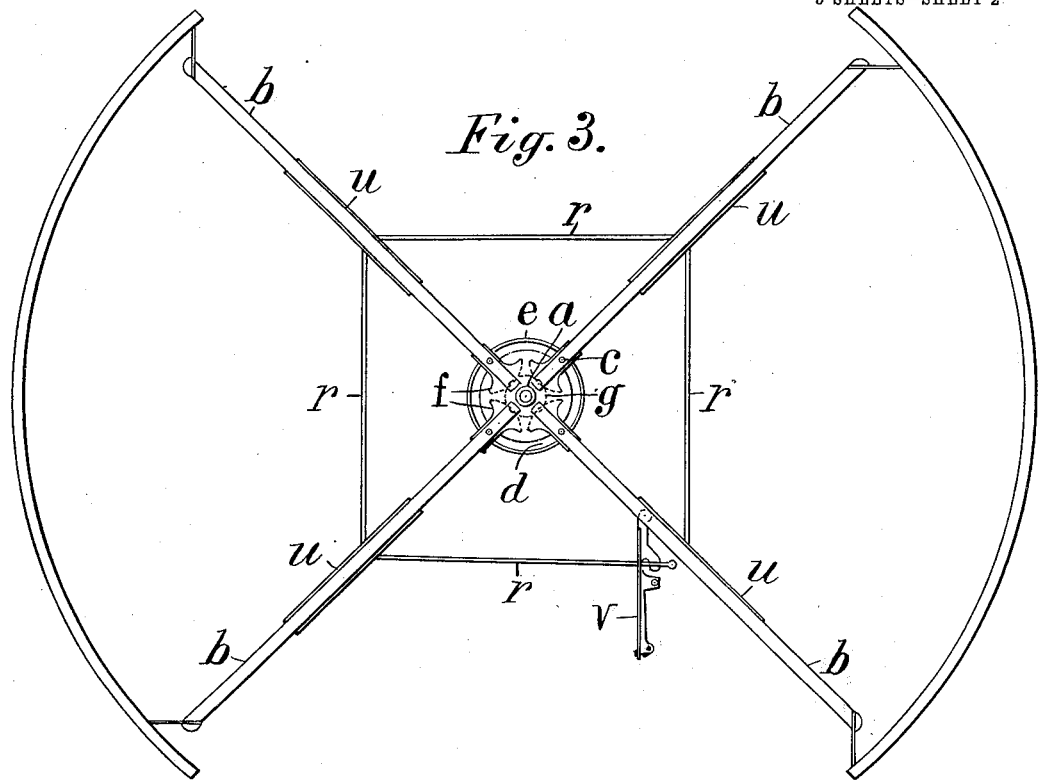
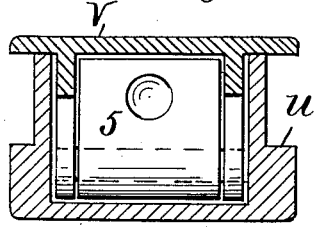
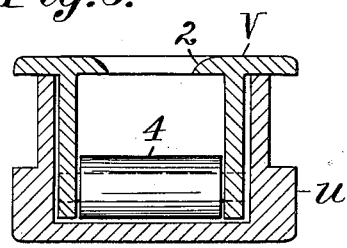
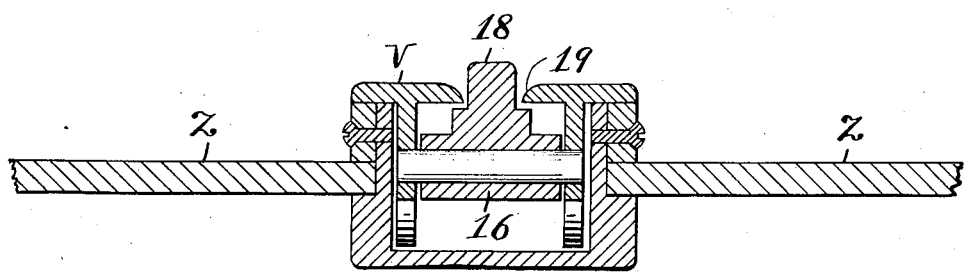
Witnesses:
L. Lee.
Arthur F. Heaton.
Inventor:
Theophilus Van Kannel
per Thomas S. Crane, Atty.

No. 836,843. PATENTED NOV. 27, 1906.
T. VAN KANNEL.
COLLAPSIBLE REVOLVING DOOR.
APPLICATION FILED OCT. 30, 1905.
5 SHEETS—SHEET 3.
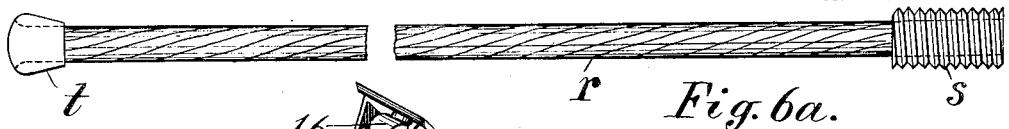
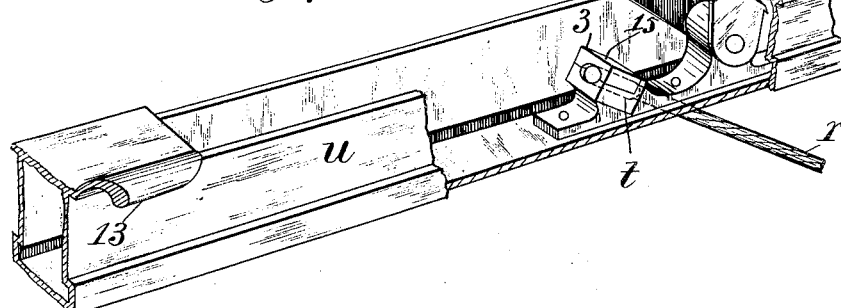
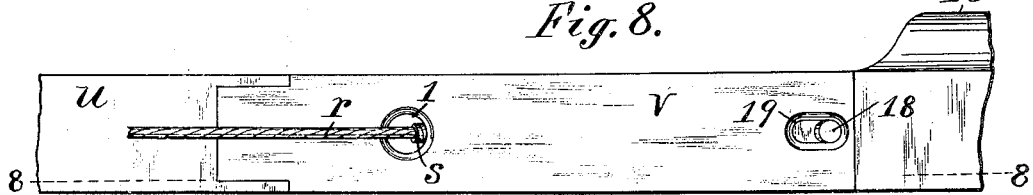
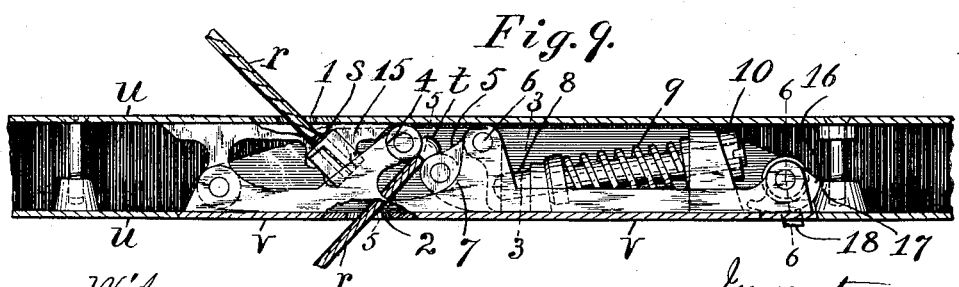

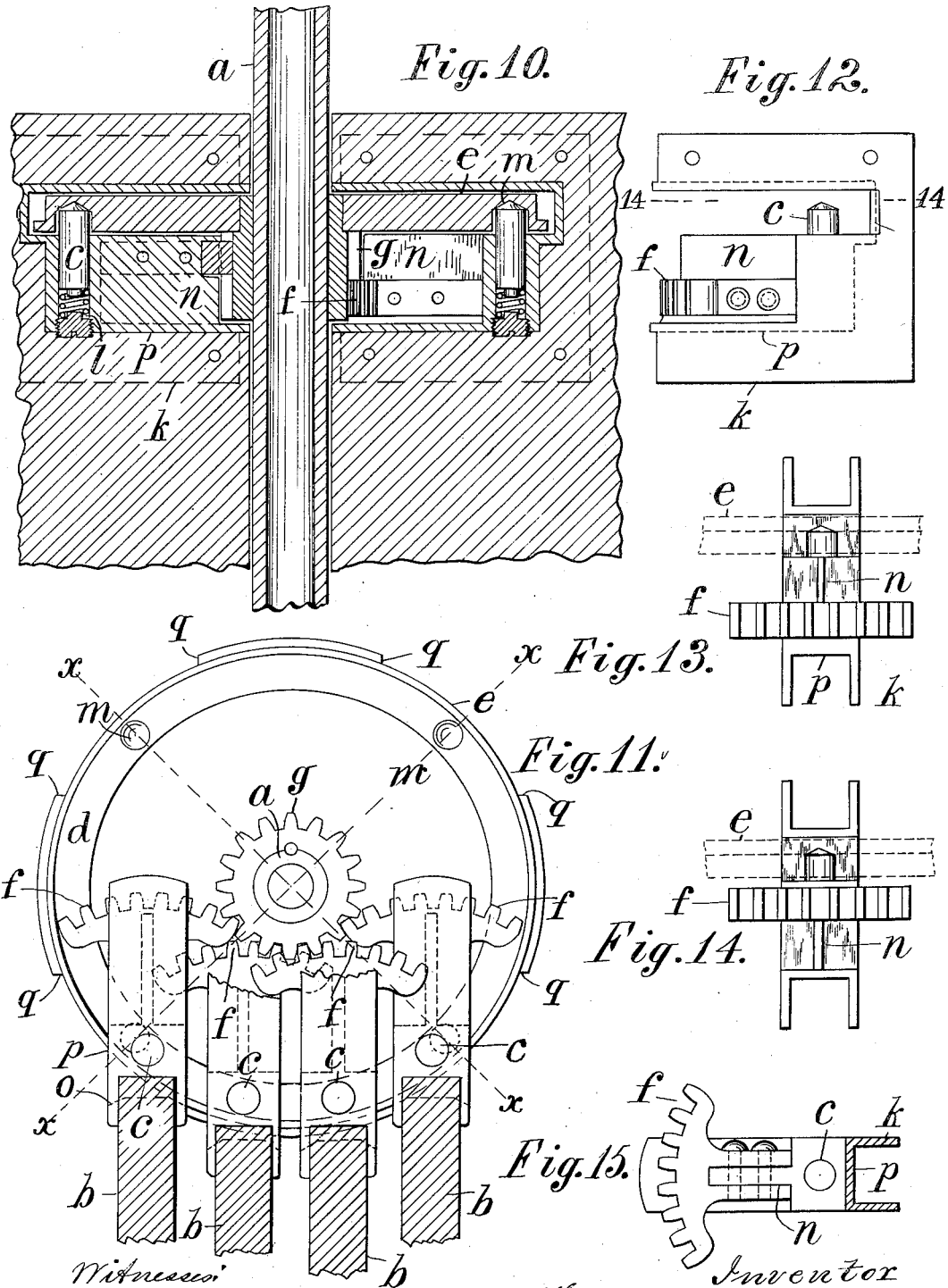

No. 836,843. PATENTED NOV. 27, 1906.
T. VAN KANNEL.
COLLAPSIBLE REVOLVING DOOR.
APPLICATION FILED OCT. 30, 1905.

5 SHEETS—SHEET 5.

UNITED STATES PATENT OFFICE.

THEOPHILUS VAN KANNEL, OF NEW YORK, N. Y., ASSIGNOR TO VAN KANNEL REVOLVING DOOR COMPANY, A CORPORATION OF WEST VIRGINIA.

COLLAPSIBLE REVOLVING DOOR.

No. 836,843.  Specification of Letters Patent.  Patented Nov. 27, 1906.

Application filed October 30, 1905. Serial No. 284,980. REISSUED

*To all whom it may concern:*

Be it known that I, THEOPHILUS VAN KANNEL, a citizen of the United States, residing at No. 524 East One Hundred and Thirty-fourth street, New York, county of New York, and State of New York, have invented certain new and useful Improvements in Collapsible Revolving Doors, fully described and represented in the following specification and the accompanying drawings, forming a part of the same.

The present invention relates to that class of revolving doors which are fitted between opposite segments of a casing in a doorway to permit the movement of persons through the doorway without the access of wind and dust.

The object of the invention is to make the door-wings collapsible when abnormal pressure is applied to any of the wings, so that in case of emergencies the doors may be collapsed automatically and swing to one side of the spindle, leaving open passages at opposite sides of the same for rapid ingress or egress. Revolving doors of such construction are thus suitable for use at the entrance of theaters, assembly-halls, and retail stores, where it is desirable to exclude wind and dust and where in case of panic it is equally important to furnish a free egress for the audience.

Any rush of persons against the revolving doors operates in the present invention to collapse the doors automatically, whatever point in the doors be pressed upon, as the construction operates, without any skill or knowledge on the part of such persons, to detach the ties or other means employed for holding the door-wings in their normal or radial positions.

The adjacent faces of the wings are shown herein connected by flexible ties formed of wire rope and made adjustable as to length to set the wings at an equal distance from one another. One end of each tie is held to the wing detachably, and the fastening device for such end is hinged upon the wing, so that it may be moved outwardly to reëngage the tie whenever detached.

The wings in the present invention are pivoted upon the central spindle in a novel manner by providing a grooved disk near each end of the spindle and furnishing each wing with two fulcrum-pins adapted each to engage the groove in one of the disks. A pinion is provided upon the spindle adjacent to each disk, and a toothed segment meshing with such pinion is attached to each of the wings and made concentric with the fulcrum-pin, and the fulcrum-pins are thus enabled to change their position upon the fulcrum-plate when the wings are moved from their normal position by their constant engagement with the groove in the disk during the rolling of the segment upon the teeth of the pinion.

The pins upon which the wings are supported are termed "fulcrum-pins" herein, as the doors are supported upon them and turn upon them during the swinging movement of the wings when collapsed. The boxes by which the pins are fixed upon the doors are termed "fulcrum-boxes," and the disks which support the pins upon the spindle are termed "fulcrum-disks."

The various details of construction will be understood by reference to the annexed drawings, in which—

Figure 1 is a side elevation of the spindle with the doors in their working position. Fig. 2 shows the upper part of one door with the notch to receive the fulcrum-box. Fig. 3 is a plan of the same parts with the door-casing partly represented. Fig. 4 is a cross-section of the tie-fastening device adjacent to the pin 6 in Fig. 9, showing one side of the yoke 5. Fig. 5 is a cross-section of the same on line 5 5 in Fig. 9. Fig. 6 is a cross-section of the same on line 6 6 in Fig. 9. Fig. 6ª shows the cord tie. Fig. 7 is a perspective view of the tie-fastening device with the cover opened to insert and engage the cord. Fig. 8 is an outside view of such fastening device, and Fig. 9 is a side elevation of the same with the side plate removed on line 8 8 in Fig. 8 and the inner part broken away to expose the aperture through which the tie is inserted. Fig. 10 is a view of the pivotal connections between the door and the spindle in section through the center of the spindle. Fig. 11 is a plan of the fulcrum-disk with the doors collapsed at one side of the same and the lower edges of the doors broken away, as well as portion of the fulcrum-boxes upon two of the doors. Fig. 12 is a side view of one of the fulcrum-boxes having the segment in the lower part of the same. Fig. 13 shows the inner edge of the fulcrum-box and the toothed face of the segment. Fig. 14 shows a view similar to Fig. 13 of a fulcrum-box with a segment in the upper part of the same, and Fig. 15 is a cross-section on line 14 14 in Fig. 12. Fig. 16 is a perspective view of the spindle and wings.

In Figs. 1 and 3, $a$ designates the spindle, and $b$ the wings, held movably adjacent to the spindle, each by a fulcrum-pin $c$ engaging the groove $d$ in the disk $e$. The wings are notched, as shown in Fig. 2, to receive fulcrum-boxes $p$, which embrace the disks, and a toothed segment $f$ is secured within each notch to mesh with the pinion $g$ upon the spindle adjacent to the disk. The engagement of the fulcrum-pin with the groove $d$ supports the pin so as to be capable of movement concentric with the spindle when the doors are detached from one another, and the pin thus operates as a fulcrum during the turning of the wing to hold the toothed segment concentric with the pinion, so that their teeth may be held in engagement during the turning of the wings from a radial to a tangential position, and vice versa. Fig. 3 shows the wings disposed at regular intervals of ninety degrees around the spindle and the center of each toothed segment engaging the pinion.

Ties $r$ (represented herein of wire rope) are shown in Figs. 1 and 2 connecting the adjacent faces of the wings, and while thus held the wings and spindle are adapted to turn together in the normal operation of the revolving door within its casing $i$. (Shown in Fig. 3.)

The detachment of any of the ties from any of the wings permits the wings to swing loosely upon their fulcrum-pins $c$, their movement causing the segments to turn them all to one side of the spindle, as shown in Fig. 11. In such movement the segments upon the adjacent wings would interfere with one another unless attached to the wings on different levels, and this arrangement is secured by forming each of the wings with the notch $j$ (shown in Fig. 2) where it embraces the disk $e$ and securing a fulcrum-box within the notch by means of flanges $k$.

The fulcrum-box $p$ is provided with a socket in which the fulcrum-pin $c$ may move longitudinally and be pressed by a spring $l$ toward the bottom of the groove in the disk. The bottom of the groove $d$ in the disk is provided, as shown in Fig. 11, with four equidistant conical recesses $m$, and the point of the fulcrum-pin $c$ is made conical to fit such recesses, which assists in disposing the wings in their normal position at equal distance from one another around the spindle. The recesses $m$ operate only as guides to the feelings of the operator in setting the wings in their normal position, as the tapering form of the recesses and pins permits the fulcrum-pins to serve as spring-catches, which push voluntarily out of the recesses when pressure upon the wings causes them to collapse. A central partition $n$ is formed in each fulcrum-box to prevent the passage of air or drafts through the same, and the toothed segments for the adjacent wings are attached to seats upon such partitions at different levels, so as to clear one another when the wings are collapsed, as shown in Fig. 11.

The teeth of the segments can be cut before they are attached to the seats $n$. The parts are so proportioned that the extremity of each segment may project into the fulcrum-box upon the adjoining door nearly to the partition $n$, but without interference from the partition or the segment attached thereto at a different level. Dotted lines $x$ in Fig. 11 indicate the normal positions of the four wings, and as such lines are at opposite angles of forty-five degrees to the plane of the collapsible wings it will be observed that the two wings at the outer sides of the group are required to turn through an arc of one hundred and thirty-five degrees to reach their normal positions, while the two central wings of the group need to turn only forty-five degrees. The pinion $g$ is shown with sixteen teeth and each of the segments $f$ with eight teeth, which enables any of the wings to move one hundred and thirty-five degrees without rolling upon more than four teeth of the pinion, and this brings the end of each segment into engagement with the pinion, when the wings are collapsed, as shown upon the two outer doors of the group in Fig. 11. To prevent the segment from rolling farther and breaking the connection of the segment with the pinion, the stops $o$ are provided upon the fulcrum-box adjacent to the fulcrum-pin, (see Figs. 11 and 12,) and opposed stops $q$ are provided upon the edge of the disk to engage the stops $o$ when the wing moves to such desired limit. In such movement the stop upon the fulcrum-box clears the first two of the stops $q$ upon the disk, but afterward sweeps inwardly against the edge of the disk and encounters the third stop $q$ after the wing has moved two hundred and seventy degrees. This is evident from the fact that the outer wings of the group in Fig. 11 require each to move one hundred and thirty-five degrees from one stop $q$ to reach its normal position, in which the fulcrum-pin $c$ engages the recesses $m$ upon the line $x$, and could be moved one hundred and thirty-five degrees farther before the stop on the fulcrum-box would encounter the other stop $q$ upon the disk.

If the wing be pushed when the stops are in contact, it operates to rotate the disk and the spindle and to bring such wing into the proper relation with the other wings to set the wings parallel with one another in their collapsed position, as shown in Fig. 11, and continued pressure upon any of the wings produces this result.

The segments and the stops are so proportioned, as shown in Fig. 11, that any of the wings when a tie between the wings is detached can be pushed in either direction and operate by continuous pressure to collapse all of the wings and bring them parallel to one another.

The fulcrum-pins near opposite ends of the wings in engagement with grooves in disks at the opposite ends of the spindle form a very inexpensive and effective joint for the wings, in which the pins can move upon the fulcrum-disks for folding all of the wings together upon one side of the spindle. The fulcrum-boxes are shown with clearance-space inside of the same above or below each of the segments for the adjacent segment to penetrate the box without interference, and it is obvious that the four segments operating upon the pinion at each end of the spindle may be made to roll in four different planes by making the pinion twice as long; but the construction shown is more economical of space and material.

To connect the doors detachably, it is necessary to have a tie which is held at one end in an adjusted gripper, which retains the tie with sufficient force to rotate the doors under normal pressure, but releases the tie when abnormal pressure is brought upon the wings, so as to let them collapse. It is also desirable that the tie should be capable of adjustment as to length, so that when the ties are first applied to the wings the wings may be set exactly at right angles to one another. To meet these requirements, I have devised the tie shown in Fig. 6ª, which consists of a piece of wire rope $r$, having a screw-threaded sleeve $s$ soldered upon one end and a knob $t$ soldered upon the opposite end. The fixture applied to the wings for holding the opposite ends of such tie is also shown in Figs. 7, 8, and 9 and consists of the gripper-box $u$, having apertures 1 and 2 upon opposite sides to admit the ends $s$ and $t$ of the tie and having a screw-threaded socket 3 for engaging the threaded sleeve $s$ and an abutment 4 and spring-gripper for detachably holding the knob $t$. The sleeve $s$ forms a screw-threaded shank upon the tie, which can be readily turned in the socket 3 when the clamp-screws 15 of the socket are loosened, and the length of the tie can thus be varied to set the wings in their operative positions. When the tie is thus suitably adjusted, it is held in its adjusted length by tightening the screws 15 to clamp the shank $s$. The box is fitted to the door-wing so that the apertures 1 and 2 are exposed upon the opposite sides of the wing, as shown in Fig. 3, and when the ends of the tie are properly secured in the clamp 3 and the spring-gripper the wings are held in an operative condition. To release the tie when subjected to abnormal pressure, the abutment 4 is formed of a roller and the spring-gripper is formed with a swing-yoke 5, pivoted on pin 6, carrying a pressure-roller 7 adjacent to the roll 4, so as to grasp the tie adjacent to the knob $t$. A plunger 8, actuated by a spring 9, presses the yoke and roll 7 normally toward the abutment 4, and a threaded plug 10 is applied to the end of the spring to adjust the same. The parts named, except the clamp-socket 3, are all attached to a cover $v$, hinged upon the gripper-box $u$, which cover can be opened, as shown in Fig. 7, (and upon one of the wings in Fig. 2,) to readily insert the knob between the rolls 4 and 7. To hold the cover normally locked, a spring-dog 16 is pivoted upon one end of the cover to engage a shoulder 17 within one end of the gripper-box, and a thumb-piece 18 is projected from the dog through a slot 19 in the cover to rock the dog when it is desired to disengage it from the shoulder to permit the cover to be opened. The dog is sloping upon the inner side, so as to be pushed automatically out of the way as the cover is closed, and its form locks it upon the abutment, so that the pull exerted upon the cover by the tie (which is held in the gripper) is firmly resisted. A shoulder upon the plunger 8 holds the roll 7 normally at a suitable distance from the roll 4 to admit the tie $r$ between the rolls, and the side plate which carries the roll 4 is formed with notch 11 adjacent to the aperture 2, so that the knob can be readily passed through such notch to locate it beyond the rolls and insert the tie $r$ between the rolls without separating the same, which would be difficult in view of the resistance of the spring 9. The casing or box which holds these parts forms a fixture containing the fastening device for the ends of the ties to adjust and retain them in the manner described. When the tie has been detached from the fastening device, it would obviously be difficult to replace the knob $t$ therein except the fixtures were hinged upon the gripper-box $u$, as shown in Fig. 7, which not only renders the interior of the gripper accessible, but brings it nearer to the adjacent door-wing, so as to afford some slack in the tie for manipulating the knob upon the end.

The fastening device may be inserted in the slot formed through the door-wing, as at the left side of Fig. 1, or it may be formed as a cross-bar extended between the stiles, as at the right side of Fig. 1, the former arrangement being suitable when a wooden panel is employed in the bottom of the wing and the latter arrangement when the whole wing is filled with glass. To expose the apertures 1 and 2 at opposite sides of the wing in the latter case, the cross-bar w is set centrally upon the stiles y and formed with grooves in its upper and lower edges to receive the glass plates z. Where the gripper-box is set in the rail 12, as at the left side of Fig. 1, a hand-rail 13 is extended between the stiles in the usual manner; but the use of such a hand-rail may be avoided when the gripper is formed in the cross-bar w by constructing a hand-rail 13 upon the cross-bar, as shown in Figs. 1, 7, and 8. Such construction enables the cross-bar to perform the double function of carrying the fixture to grasp the ends of the ties detachably and also to furnish a support for the hand in pressing upon the door, and thus obviate the necessity of a special hand-rail.

From the above description it will be understood that the ties between the wings hold the doors firmly in their operative relations until detached and that the ties are not yielding in themselves, but that the fastening for one or both ends of the ties is of a yielding character, so as to form a detachable engagement with the tie which will release when exposed to abnormal pressure, thus making the collapsing of the wings entirely automatic in emergencies and requiring no especial skill or attention on the part of the passenger to clear the passage-way.

Having thus set forth the nature of the invention, what is claimed herein is—

1. In a revolving door, a central spindle, a series of wings pivoted thereto and fixtures connecting the adjacent sides of the wings, and provided with automatically-detachable fastenings adjusted to permit the automatic collapsing of the wings under abnormal pressure.

2. In a revolving door, the combination, with a suitable casing and a central spindle, of a series of wings pivoted thereto, and ties attached to the adjacent sides of the wings, and secured by detachable fastenings adapted to hold the wings normally in a radial position upon the spindle, and adjusted to release the wings when subjected to abnormal pressure, to permit the collapsing of the wings.

3. A revolving door having a suitable casing, a spindle centered therein with hanger-disks near its opposite ends, and a series of wings having fulcrum-pins movable upon such fulcrum-disks, for folding all of the wings together upon one side of the spindle.

4. A revolving door having a suitable casing, a spindle centered therein and provided with toothed pinions, and a series of wings having "fulcrum-pins" movably supported upon a spindle and provided each with a toothed segment engaging such pinion to cause its pins to move so as to bring the wing tangential to the spindle when the wing is moved relatively to the spindle.

5. A revolving door having a suitable casing, a spindle centered therein with fulcrum disks and pinions near its opposite ends, and a series of wings having fulcrum-pins movable upon said fulcrum-disks and provided each at opposite ends with a toothed segment engaging a pinion, to cause the pins of each wing to move so as to bring the wing tangential to the spindle when the wing is moved relatively to the spindle.

6. A revolving door having a suitable casing, a spindle centered therein with fulcrum disks and pinions near its opposite ends, and a series of wings having fulcrum-pins movable upon the fulcrum-disks and provided each at opposite ends with a toothed segment engaging a pinion, to cause the pins of each wing to move so as to bring the wing tangential to the spindle when the wing is moved relatively to the spindle, the segments upon the several wings being arranged to operate at different levels upon the said pinions so as to clear one another when collapsed at one side of the spindle.

7. A revolving door having a suitable casing, a spindle centered therein and provided with toothed pinion, and a series of wings having fulcrum-pins so as to be capable of movement concentric with the spindle and provided each with a toothed segment engaging such pinion, the teeth in such segment proportioned to engage a semicircumference of the pinion, whereby any of the wings may be rolled one hundred and fifty-five degrees from its normal position.

8. A revolving door having a suitable casing, a spindle centered therein with fulcrum disks and pinions near its opposite ends, a series of wings having fulcrum-pins supported so as to be capable of movement concentric with the spindle, and the wings provided each at opposite ends with toothed segments engaging such pinions, and stops to limit the rolling of the segments upon the pinions.

9. A revolving door having a suitable casing, a spindle centered therein with fulcrum disks and pinions near its opposite ends, a series of wings having fulcrum-pins supported so as to be capable of movement concentric with the spindle and the wings provided at opposite ends with toothed segments engaging such pinions, stops to limit the rolling of the segments upon the pinions, and spring-catches for engaging the wings, when in their normal quadrantal positions, detachably with the disks.

10. A revolving door having a suitable casing, a spindle centered therein with fulcrum disks and pinions near its opposite ends, and a series of wings having each recesses near its opposite ends to fit over the disks and pinions, and fulcrum-boxes fitted to the recesses and provided each with a fulcrum-pin movable upon the disk and with a toothed segment engaging the pinion, the toothed segments in the several boxes being arranged to engage the pinions at different levels, whereby the segments clear one another when the wings are folded to one side of the spindle.

11. A revolving door having a suitable casing, a spindle centered therein with fulcrum disks and pinions near its opposite ends, and a series of wings having each recesses near its opposite ends to fit over the disks and pinions, and fulcrum-boxes fitted to the recesses and provided each with a fulcrum-pin movable upon the disk and with a toothed segment engaging the pinion, the boxes having partitions $n$, with seats provided at different levels upon the several wings with the toothed segments attached to such seats, whereby the teeth may be cut in the segments before they are attached to the boxes.

12. A revolving door having a suitable casing, a spindle centered therein with fulcrum disks and pinions near its opposite ends, the opposed faces of the disks having each a groove near its periphery, a series of wings having each a fulcrum-pin fitted to the said groove, and a toothed segment concentric with such pin and engaging the pinion, whereby the wings may be collapsed by the rolling of the segments upon the pinions and the shifting of the fulcrum-pins in the grooves.

13. In a revolving door having collapsible wings, the combination, with a strap or cord fastened upon one wing, of a fastening device upon the adjacent wing arranged and operated to grasp the end of such strap detachably and to resist the normal pressure upon the wings, and adjusted to release the strap under abnormal pressure, whereby the wings are automatically collapsed under such pressure.

14. In a revolving door having collapsible wings, the combination, with a strap or cord fastened upon one wing and having a knob upon the end, of a fastening device upon the adjacent door comprising an abutment for one side of the knob, and a spring-gripper opposed thereto and adjusted to retain the knob under the normal operation of the doors, and to release the knob under abnormal pressure, to permit the automatic collapsing of the doors.

15. In a revolving door having collapsible wings, the combination, with each wing, of a fixture attached to the wing and having apertures upon opposite sides, a clamp within each fixture adjacent to one of the apertures for gripping one end of the cord, and a fastening device within the fixture adjacent to the other aperture having a spring-gripper to grasp the end of an adjacent cord detachably, whereby all the wings are detachably connected, and the wings may be automatically collapsed when abnormal pressure is applied to any one of them.

16. In a revolving door having collapsible wings, the combination, with each wing, of a fixture attached to the wing and having apertures upon opposite sides, a clamp within each fixture adjacent to one of the apertures for gripping one end of the cord, and a fastening device within the fixture adjacent to the other aperture comprising an abutment provided with a roller and an adjacent spring-gripper provided with a roller, and cords connecting the several fixtures and secured each at one end in the fixture-clamp, and provided at the other end with a knob to engage the rollers in one of the fixtures.

17. In a revolving door, a wing-fixture combined with a cord to retain the wings detachably in an operative position, the fixture consisting of the box $u$ attached to the wing with aperture in the bottom and clamp adjacent to the aperture for holding the end of the cord, a cover hinged upon the box and having an aperture for the insertion of a cord with knob upon the end, an abutment upon the cover having a roller adjacent to such aperture, and a spring-gripper provided with a roller, with space at the ends of the rollers to pass the knob beyond the same, and a latch to hold the cover normally closed upon the box.

18. In a revolving door, a tie formed of a wire rope $r$ provided with screw-threaded shank $s$ upon one end and knob $t$ upon the opposite end, fixtures upon the wings adapted to engage the screw-thread adjustably and to retain the knob detachably, whereby the length of the tie may be adjusted and it may be automatically released when subjected to abnormal pressure.

19. In a revolving door, a tie formed of a wire rope $r$ provided with screw-threaded shank $s$ upon one end and knob $t$ upon the opposite end, and fixtures upon the wings provided each with the threaded clamp-socket 3 to engage the screw-thread $s$ adjustably, and a spring-gripper to engage the knob $t$ detachably, as and for the purpose set forth.

20. In a revolving door, the combination, with hinged door-wings, of ties extended between the adjacent faces of the wings, and fixtures upon the wings provided each with a clamp for one end of the tie, and a spring-gripper to engage the opposite end of a tie detachably, such spring-gripper being hinged upon the said fixture to facilitate the engagement of the tie with the spring-gripper.

21. In a revolving door, the combination, with the wings furnished with glass panels and connected by ties between their adjacent faces, of the cross-bar $w$ provided with grooves upon its upper and lower edges for the glass, the hand-rail 14 for pushing the wing, and containing a fixture for clamping one end of a tie and for holding the opposite end of a tie detachably, whereby the wings may be collapsed under abnormal pressure.

In testimony whereof I have hereunto set my hand in the presence of two subscribing witnesses.

THEOPHILUS VAN KANNEL.

Witnesses:
FRED FIEN,
JOHN J. RAPP.